United States Patent
Sethi et al.

(10) Patent No.: US 12,530,271 B2
(45) Date of Patent: Jan. 20, 2026

(54) DYNAMIC ROUTING OF DATA RESPONSIVE TO HARDWARE COMPONENT FAILURES

(71) Applicant: Dell Products L.P., Round Rock, TX (US)

(72) Inventors: Parminder Singh Sethi, Ludhiana (IN); Pandiyarajan Mani, Bangalore (IN); Banabihari Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/661,154

(22) Filed: May 10, 2024

(65) Prior Publication Data

US 2025/0348389 A1 Nov. 13, 2025

(51) Int. Cl.
*G06F 11/20* (2006.01)

(52) U.S. Cl.
CPC ........ *G06F 11/201* (2013.01); *G06F 2201/85* (2013.01)

(58) Field of Classification Search
CPC .. G06F 11/142; G06F 11/1423; G06F 11/201; G06F 11/2035; G06F 2201/85
See application file for complete search history.

(56) References Cited

U.S. PATENT DOCUMENTS

| | | | | |
|---|---|---|---|---|
| 7,434,107 B2 * | 10/2008 | Marks | ................. | H04L 67/1097 |
| | | | | 714/43 |
| 9,645,902 B2 * | 5/2017 | Breakstone | ......... | G06F 11/2069 |
| 10,365,981 B2 * | 7/2019 | Marripudi | ........... | G06F 11/2092 |
| 10,581,596 B2 * | 3/2020 | Schmisseur | ........... | H04L 9/0894 |

FOREIGN PATENT DOCUMENTS

WO WO-2017095424 A1 * 6/2017 ............. G06F 13/42

OTHER PUBLICATIONS

A. S. Gills et al., "Gigabit Ethernet (GbE)," https://www.techtarget.com/searchnetworking/definition/Gigabit-Ethernet, Sep. 2021, 8 pages.
(Continued)

*Primary Examiner* — Joseph R Kudirka
(74) *Attorney, Agent, or Firm* — Ryan, Mason & Lewis, LLP

(57) ABSTRACT

An apparatus comprises a processing device configured to identify, for a modular server comprising a chassis, a plurality of hardware components installed in the chassis, wherein the plurality of hardware components comprise at least a first input-output module and a second input-output module, and a first expander and a second expander of a storage system installed in the chassis, to determine a failure of one or more of the first input-output module, the second input-output module, the first expander and the second expander, and to dynamically route data through respective ones of the plurality of hardware components which remain operational in response to the determined failure. The processing device is connected to the first input-output module, the second input-output module, the first expander and the second expander.

20 Claims, 10 Drawing Sheets

(56) References Cited

OTHER PUBLICATIONS

Dell Technologies, "Dell EMC OpenManage Enterprise—Modular Edition Version 1.00.10 for PowerEdge MX7000 Chassis User's Guide," https://www.dell.com/support/manuals/en-us/openmanage-enterprise-modular/omem1.00.10_ug/managing-sas-ioms?guid=guid-73b44c6e-984b-4f25-89e3-0d17ed1ce17b&lang=en-us, Accessed May 10, 2024, 1 page.
Dell Technologies, "Dell PowerEdge MX5016s Storage Sled," https://infohub.delltechnologies.com/en-us/l/dell-poweredge-mx-deployment-with-vmware-cloud-foundation-deployment-guide/dell-poweredge-mx5016s-storage-sled/, Accessed May 10, 2024, 2 pages.
Dell Technologies, "Dell EMC PowerEdge MX7000," Technical Guide, Dell Technologies, Feb. 2023, 51 pages.
Sparkfun Electronics, "I2C", https://learn.sparkfun.com/tutorials/i2c/all, Accessed May 10, 2024, 16 pages.
R. S. D. Souza, "I2C Protocol," https://www.prodigytechno.com/i2c-protocol, Accessed May 10, 2024, 6 pages.
Dell Technologies, "PowerEdge Tutorials: Physical Disks and RAID Controller (PERC) on Servers", Article No. 000131039, https://www.dell.com/support/kbdoc/en-us/000131039/poweredge-tutorials-physical-disks-and-raid-controller-perc-on-servers, Apr. 15, 2024, 5 pages.
IBM, "SAS Architecture," https://www.ibm.com/docs/en/power6?topic=overview-sas-architecture, Mar. 5, 2021, 2 pages.

* cited by examiner

DYNAMIC ROUTING OF DATA RESPONSIVE TO HARDWARE COMPONENT FAILURES

FIELD

The field relates generally to information processing, and more particularly to managing information processing systems.

BACKGROUND

A given set of electronic equipment configured to provide desired system functionality is often installed in a chassis. Such equipment can include, for example, various arrangements of storage devices, memory modules, processors, circuit boards, interface cards and power supplies used to implement at least a portion of a storage system, a multi-blade server system or other type of information processing system.

Redundancy in connection with data paths facilitates effective transfer of data. However, current approaches may result in a lack of data transfer even though a redundant configuration may be implemented.

SUMMARY

Illustrative embodiments of the present disclosure provide techniques for dynamic routing of data responsive to hardware component failures.

In one embodiment, an apparatus comprises at least one processing device comprising a processor coupled to a memory. The at least one processing device is configured to identify, for a modular server comprising a chassis, a plurality of hardware components installed in the chassis, wherein the plurality of hardware components comprise at least a first input-output module and a second input-output module, and a first expander and a second expander of a storage system installed in the chassis, to determine a failure of one or more of the first input-output module, the second input-output module, the first expander and the second expander, and to dynamically route data through respective ones of the plurality of hardware components which remain operational in response to the determined failure. The at least one processing device is connected to the first input-output module, the second input-output module, the first expander and the second expander.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Information technology (IT) assets, also referred to herein as IT equipment, may include various compute, network and storage hardware or other electronic equipment, and are typically installed in an electronic equipment chassis. The electronic equipment chassis may form part of an equipment cabinet (e.g., a computer cabinet) or equipment rack (e.g., a computer or server rack, also referred to herein simply as a "rack") that is installed in a data center, computer room or other facility. Equipment cabinets or racks provide or have physical electronic equipment chassis that can house multiple pieces of equipment, such as multiple computing devices (e.g., blade or compute servers, storage arrays or other types of storage servers, storage systems, network devices, etc.). As noted above, an electronic equipment chassis typically complies with established standards of height, width and depth to facilitate mounting of electronic equipment in an equipment cabinet or other type of equipment rack. For example, standard chassis heights such as 1 U, 2 U, 3 U, 4 U and so on are commonly used, where U denotes a unit height of 1.75 inches (1.75") in accordance with the well-known EIA-310-D industry standard.

Figure 1:
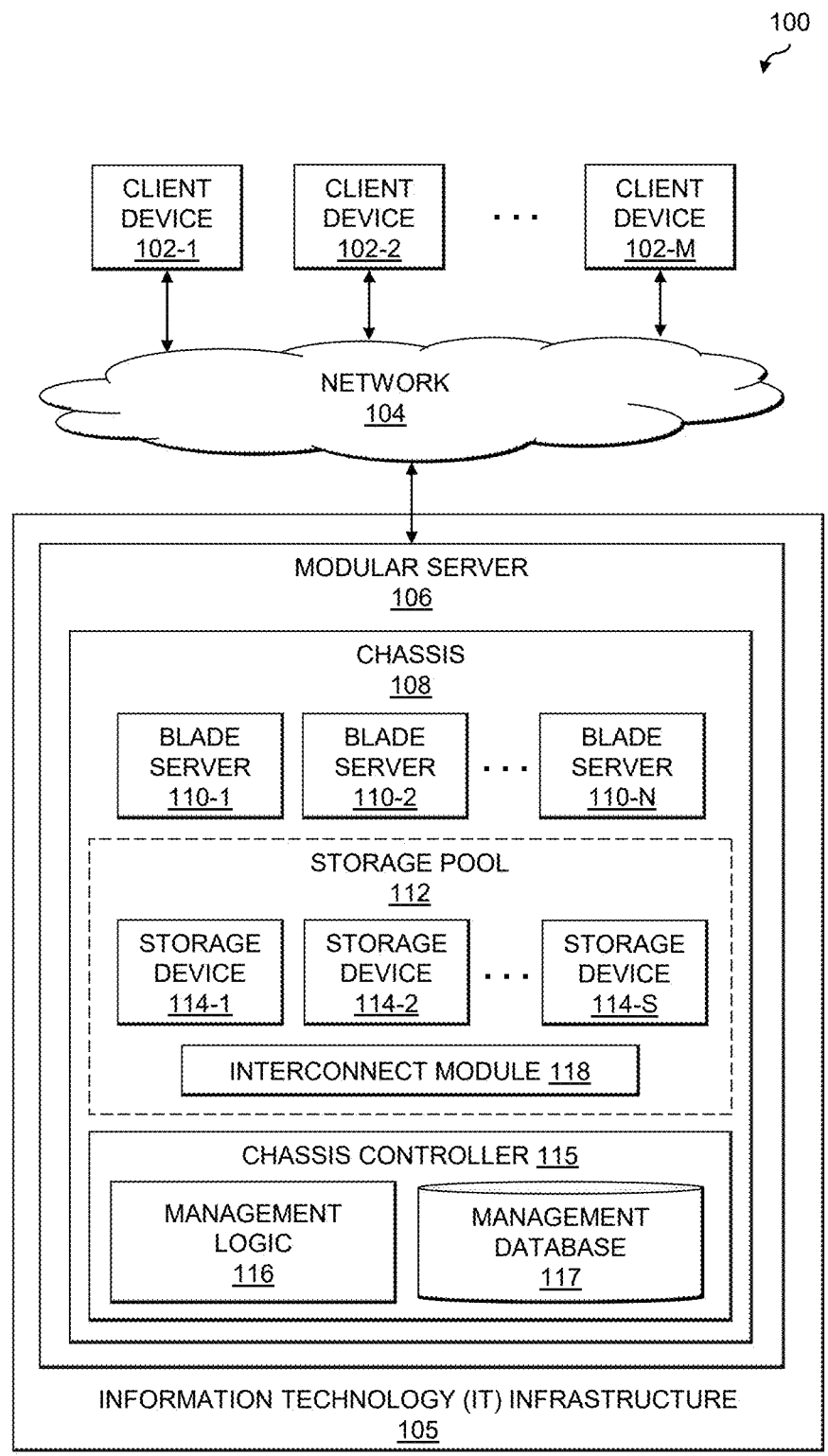
FIG. 1 is a block diagram of an information processing system configured for dynamic routing of data responsive to hardware component failures in an illustrative embodiment.

FIG. 1 shows an information processing system 100 configured in accordance with an illustrative embodiment. The information processing system 100 is assumed to be built on at least one processing platform and provides functionality for dynamic routing of data responsive to hardware component failures. The information processing system 100 includes a set of client devices 102-1, 102-2, . . . 102-M (collectively, client devices 102) which are coupled to a network 104. Also coupled to the network 104 is an IT infrastructure 105 comprising one or more IT assets including at least one modular server 106. The IT assets of the IT infrastructure 105 may comprise physical and/or virtual computing resources. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The modular server 106 includes a chassis 108 in which a set of blade servers 110-1, 110-2, . . . 110-N (collectively, blade servers 110) and a storage pool 112 comprising a set of storage devices 114-1, 114-2, . . . 114-S (collectively, storage devices 114) are installed. The chassis 108 also includes a chassis controller 115 implementing management logic 116 and a management database 117, which are configured to provide general management functionalities and storage of management data (e.g., blade server 110 to storage device 114 assignment, blade server 110 configuration, storage device 114 configuration, etc.) for the electronic equipment in the chassis 108.

Still further, as shown and as will be further explained in detail, IT infrastructure 105 comprises at least one interconnect module 118, which can be part of the storage pool 112, and which is configured to identify hardware components in the chassis 108, determine when one or more of the hardware components have failed and dynamically route and/or re-route data through paths corresponding to operational hardware components that are active and have not failed. As used herein, "failure" can refer to situations when devices and/or components malfunction, become inoperable or otherwise fail to operate and/or perform functions in the manner in which they are intended to operate and/or function. An illustrative example of the interconnect module 118 includes interconnect module 518 explained in connection with the information processing system 500 in FIG. 5, and also referenced in FIGS. 6-8. For purposes of this disclosure, descriptions of the interconnect module 118 may apply to the interconnect module 518 and vice versa.

In some embodiments, the modular server 106 is used for an enterprise system. For example, an enterprise may have various IT assets, including the modular server 106, which it operates in the IT infrastructure 105 (e.g., for running one or more software applications or other workloads of the enterprise) and which may be accessed by users of the enterprise system via the client devices 102. As used herein, the term "enterprise system" is intended to be construed broadly to include any group of systems or other computing devices. For example, the IT assets of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the modular server 106, as well as to support communication between the modular server 106 and other related systems and devices not explicitly shown.

In some embodiments, the client devices 102 are assumed to be associated with system administrators, IT managers or other authorized personnel responsible for managing the IT assets of the IT infrastructure 105, including the modular server 106. For example, a given one of the client devices 102 may be operated by a user to access a graphical user interface (GUI) provided by the chassis controller 115 to manage one or more of the blade servers 110 and/or one or more of the storage devices 114 of the storage pool 112. In some embodiments, functionality of the chassis controller 115 (e.g., the management logic 116) may be implemented outside the chassis controller 115 (e.g., on one or more other ones of the IT assets of the IT infrastructure 105, on one or more of the client devices 102, an external server or cloud-based system, etc.).

In some embodiments, the client devices 102, the blade servers 110 and/or the storage pool 112 may implement host agents that are configured for automated transmission of information regarding the modular server 106 (e.g., the current storage configuration or mapping between different ones of the storage devices 114 and particular ones of the slots of the chassis 108 in which different ones of the blade servers 110 are installed. It should be noted that a "host agent" as this term is generally used herein may comprise an automated entity, such as a software entity running on a processing device. Accordingly, a host agent need not be a human entity.

The chassis controller 115 in the FIG. 1 embodiment is assumed to be implemented using at least one processing device. Each such processing device generally comprises at least one processor and an associated memory, and implements one or more functional modules or logic for controlling certain features of the modular server 106. In the FIG. 1 embodiment, the chassis controller 115 implements the management logic 116. As mentioned, data associated with management functionalities of the management logic 116 is maintained in the management database 117. In some embodiments, one or more of the storage systems utilized to implement the management database 117 comprise a scale-out all-flash content addressable storage array or other type of storage array.

Likewise, the interconnect module 118 in the FIG. 1 embodiment is assumed to be implemented using at least one processing device which comprises at least one processor and an associated memory. The interconnect module 118 may also have a database associated therewith (not expressly shown). In some embodiments, one or more of the storage systems utilized to implement the database associated with the interconnect module 118 comprise a scale-out all-flash content addressable storage array or other type of storage array. As explained in more detail herein, the interconnect module 118 is connected between multiple hardware components and provides a path for data between operational hardware components (e.g., components that have not failed) through the interconnect module 118. As noted herein above, the above descriptions may equally apply to the interconnect module 518 in the FIG. 5 embodiment.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

It is to be appreciated that the particular arrangement of the client devices 102, the IT infrastructure 105 and the modular server 106 illustrated in the FIG. 1 embodiment is presented by way of example only, and alternative arrangements can be used in other embodiments. As discussed above, for example, the modular server 106 (or portions of components thereof, such as one or more of the management logic 116 and the management database 117) may in some embodiments be implemented internal to one or more of the client devices 102 and/or other IT assets of the IT infrastructure 105.

At least portions of the interconnect module 118 (and interconnect module 518) may be implemented at least in part in the form of software that is stored in memory and executed by a processor.

The modular server 106 and other portions of the information processing system 100, as well as portions of the information processing system 500 in the FIG. 5 embodiment, as will be described in further detail below, may be part of cloud infrastructure.

Figure 5:
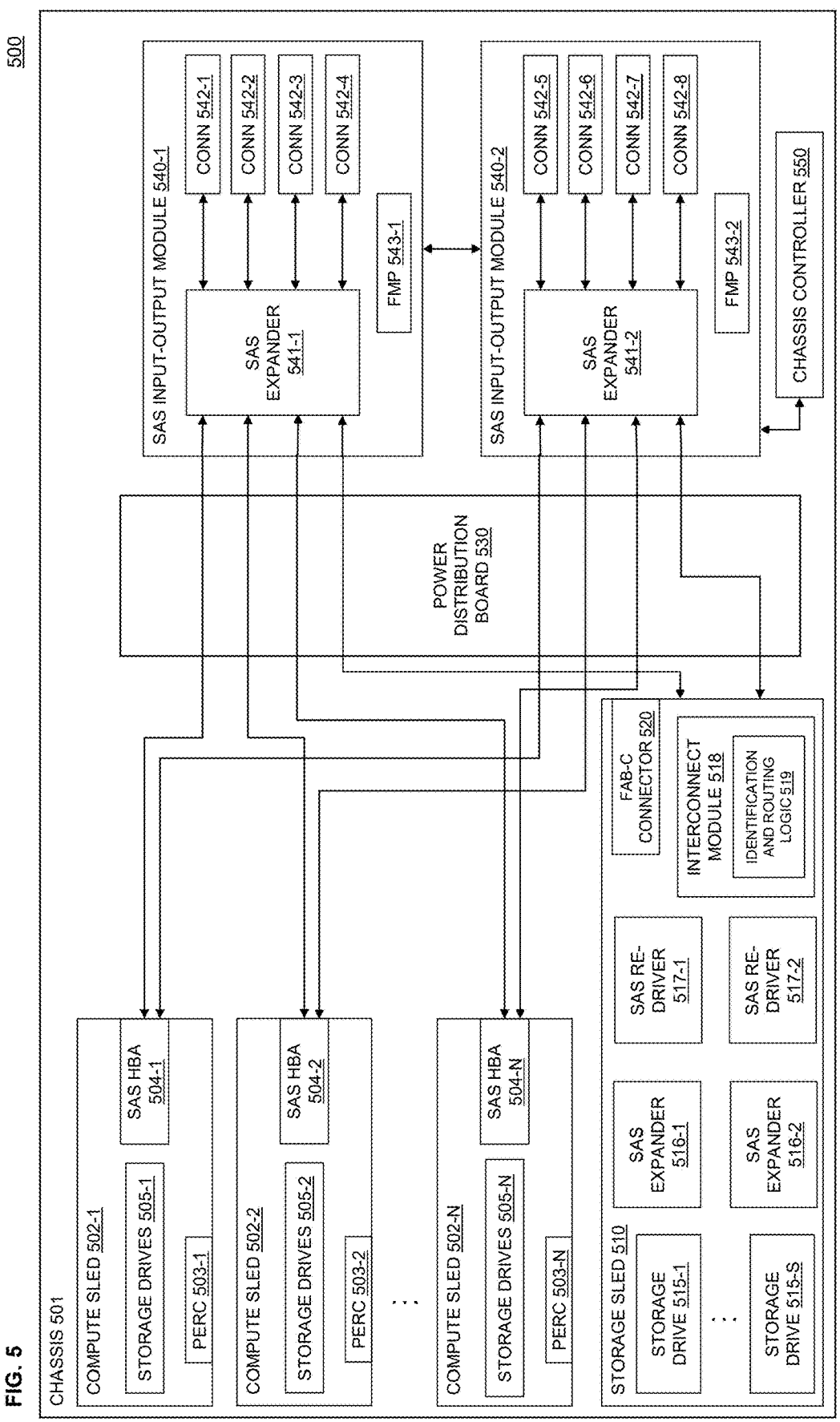
FIG. 5 shows an architecture of an information processing system configured for dynamic routing of data responsive to hardware component failures in an illustrative embodiment.

The modular server 106 and other components of the information processing system 100 in the FIG. 1 embodiment, as well as portions of the information processing system 500 in the FIG. 5 embodiment, are assumed to be implemented using at least one processing platform comprising one or more processing devices each having a processor coupled to a memory. Such processing devices can illustratively include particular arrangements of compute, storage and network resources.

The client devices 102, IT infrastructure 105, the modular server 106 or components thereof (e.g., the blade servers 110, the storage pool 112, the chassis controller 115, the interconnect module 118, etc.) may be implemented on respective distinct processing platforms, although numerous other arrangements are possible. For example, in some embodiments at least portions of the modular server 106 and one or more of the client devices 102 are implemented on the same processing platform. A given client device (e.g., 102-1) can therefore be implemented at least in part within at least one processing platform that implements at least a portion of the modular server 106.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, the modular server 106, the interconnect module 118 or portions or components thereof, to reside in different data centers. It is also possible in some implementations of the information processing system 500 or portions or components thereof to reside in different data centers, Numerous other distributed implementations are possible.

Additional examples of processing platforms utilized to implement the information processing systems 100 and 500 in illustrative embodiments will be described in more detail below in conjunction with FIGS. 9 and 10.

It is to be appreciated that these and other features of illustrative embodiments are presented by way of example only, and should not be construed as limiting in any way.

It is to be understood that the particular sets of elements shown in FIGS. 1 and 5 for dynamic routing of data responsive to hardware component failures are presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
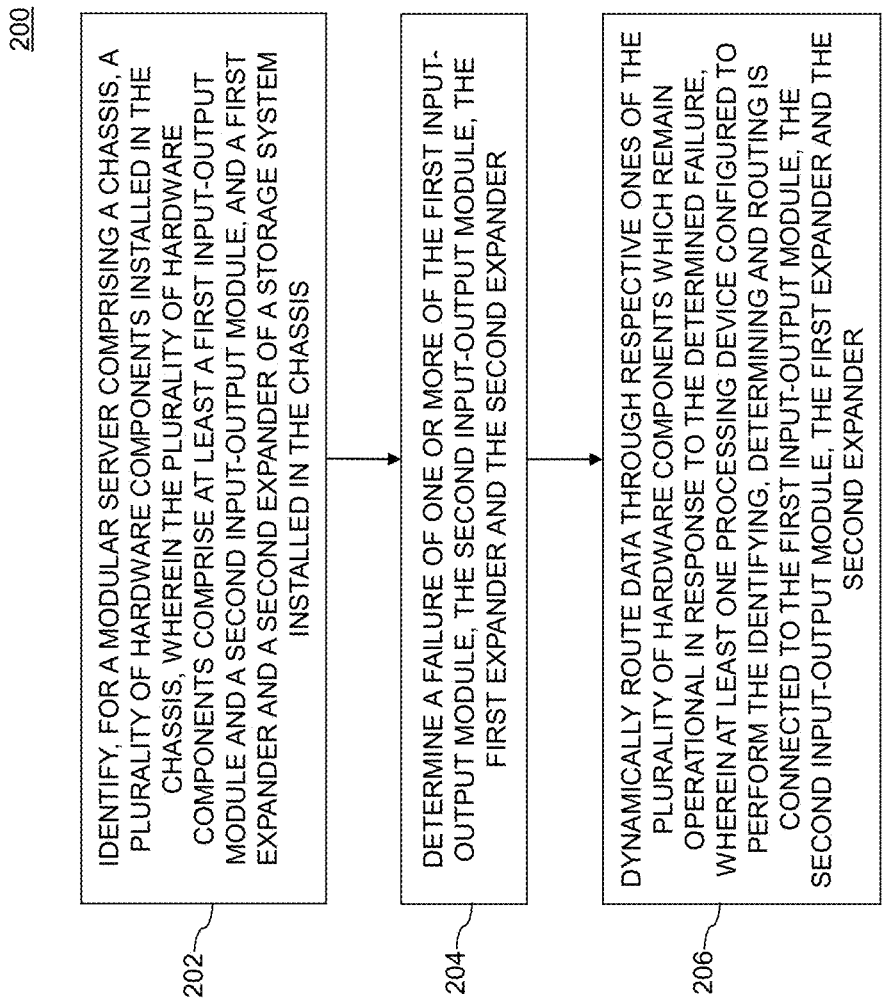
FIG. 2 is a flow diagram of an exemplary process for dynamic routing of data responsive to hardware component failures in an illustrative embodiment.

An exemplary process for dynamic routing of data responsive to hardware component failures will now be described in more detail with reference to the flow diagram of FIG. 2. It is to be understood that this particular process is only an example, and that additional or alternative processes for dynamic routing of data responsive to hardware component failures may be used in other embodiments.

In this embodiment, the process 200 includes steps 202 through 206. As mentioned, in illustrative embodiments, one or more of these steps are assumed to be performed by the interconnect module 118/518 utilizing, for example, the identification and routing logic 519 discussed in more detail in connection with FIG. 5. The process begins with step 202, identifying, for a modular server (e.g., modular server 106) comprising a chassis (e.g., chassis 108), a plurality of hardware components installed in the chassis, wherein the plurality of hardware components comprise at least a first input-output module and a second input-output module, and a first expander and a second expander of a storage system installed in the chassis. As explained in more detail herein in connection with FIG. 5, the first input-output module, the second input-output module, the first expander and the second expander respectively comprise a first SAS input-output module (IOM) 540-1, a second SAS IOM 540-2, a first SAS expander 516-1 and a second SAS expander 516-2. The storage system comprises a storage sled 510, in which the interconnect module 518 comprising the identification and routing logic 519 is installed. The interconnect module 518 is connected to the first SAS IOM 540-1, the second SAS IOM 540-2, the first SAS expander 516-1 and the second SAS expander 516-2.

Identifying the plurality of hardware components installed in the chassis may comprise determining a hardware configuration of each of the plurality of hardware components. In illustrative embodiments, the determined hardware configuration for a given one of the hardware components may be maintained in a trusted platform module (TPM). TPMs use multiple physical security mechanisms to ensure that hardware components are tamper-resistant and that no malicious software is detected.

Step 204 comprises determining a failure of one or more of the first input-output module, the second input-output module, the first expander and the second expander, and step 206 comprises dynamically routing data through respective ones of the plurality of hardware components which remain operational in response to the determined failure. The interconnect module 518 is connected between the respective ones of the plurality of hardware components which remain operational and the process includes dynamically routing the data through the interconnect module 518.

As explained in more detail in connection with FIGS. 5 and 7, a first signal conditioner (e.g., SAS re-driver 517-1) is connected between the interconnect module (e.g., interconnect module 518) and the first expander (e.g., SAS expander 516-1), and a second signal conditioner (e.g., SAS re-driver 517-2) is connected between the interconnect module (e.g., interconnect module 518) and the second expander (e.g., SAS expander 516-2). The first expander (e.g., SAS expander 516-1) is also connected to the second expander (e.g., SAS expander 516-2) and the first IOM (e.g., SAS IOM 540-1) is connected to the second IOM (e.g., SAS IOM 540-2).

As explained in more detail in connection with FIGS. 5 and 7, interconnect module (e.g., interconnect module 518) is connected to the first expander (e.g., SAS expander 516-1) by a first plurality of SAS communication paths (e.g., X4 SAS) and the interconnect module (e.g., interconnect module 518) is connected to the second expander (e.g., SAS expander 516-2) by a second plurality of SAS communication paths (e.g., X4 SAS). The interconnect module (e.g., interconnect module 518) is connected to the first IOM (e.g., SAS IOM 540-1) by a first plurality of SAS communication paths (e.g., X4 SAS) and the interconnect module (e.g., interconnect module 518) is connected to the second IOM (e.g., SAS IOM 540-2) by a second plurality of SAS communication paths (e.g., X4 SAS). The interconnect module (e.g., interconnect module 518) is further connected to the first IOM (e.g., SAS IOM 540-1) and to the second IOM (e.g., SAS IOM 540-2) through a fabric connector (e.g., Fab-C connector 520), wherein the fabric connector is plugged into a power distribution board (e.g., power distribution board (PDB) 530).

It is realized herein that due to the hardware feasibility of accommodating a large number of hard disk drives (HDDs) or other storage devices, as well as the availability of centralized storage management functionality for multiple servers, various end-users utilize a "modular" server architecture and "blade" servers for applications which require a large amount of storage space. A modular server may include an enclosure or chassis, one or more blade servers, and one or more storage servers providing a storage pool that is utilized by the one or more blade servers. The chassis includes multiple slots in which the blade servers and storage servers may be installed. The chassis also includes management software (e.g., which may run as part of a chassis controller or chassis management console) providing various functionality for managing the blade servers and storage servers which are installed in the chassis. The chassis may also include one or more power supplies for powering the blade servers and storage servers installed in the chassis, cooling equipment (e.g., one or more fans) for cooling the blade servers and storage servers installed in the chassis, networking equipment (e.g., one or more network interface controllers, host adapters, etc.) which may be utilized by the blade servers and storage servers installed in the chassis, etc. In a modular server, the installed blade servers are physical servers configured to work independently, while the storage servers providing the storage pool may comprise a set of storage devices arranged in a Just a Bunch of Drives (JBOD) configuration.

Figure 3:
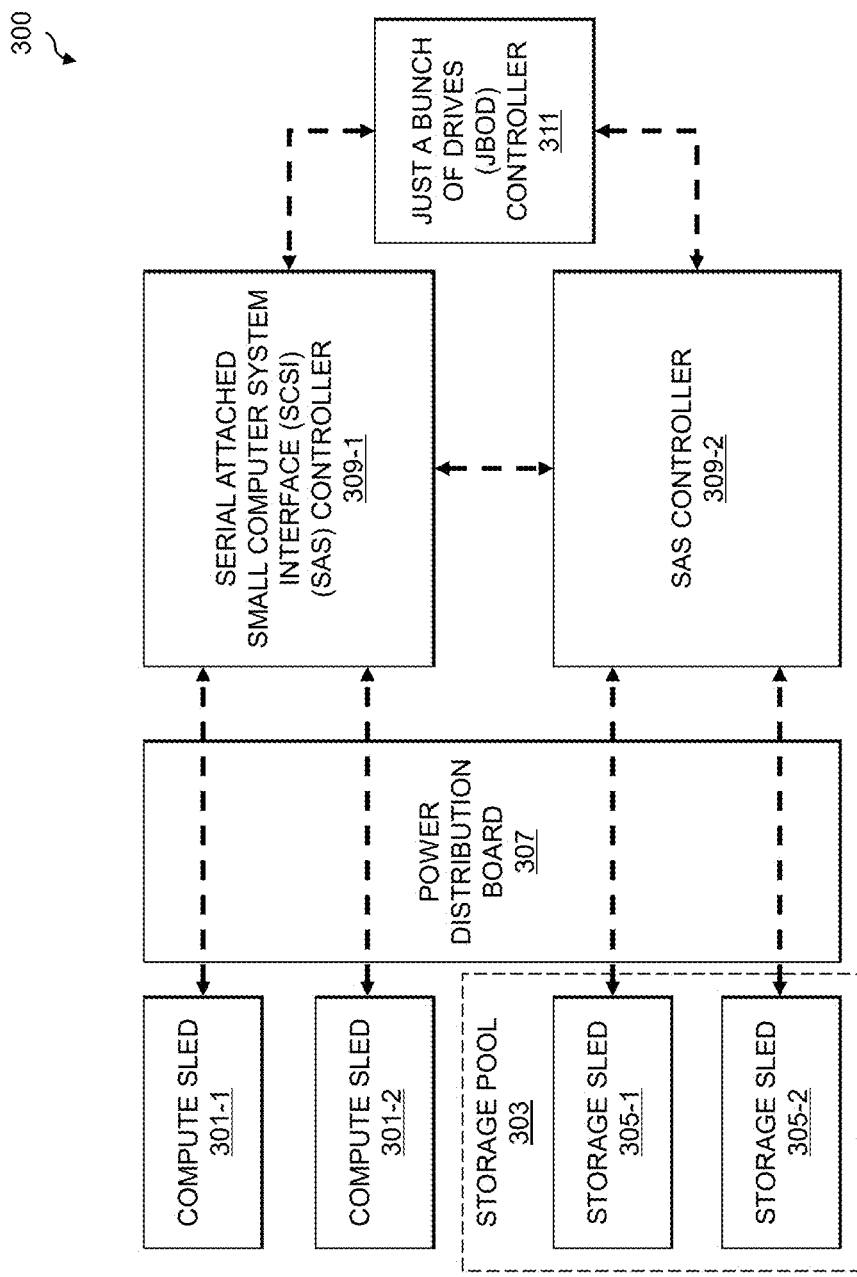
FIG. 3 shows a storage architecture of a modular server in an illustrative embodiment.

By way of example only, FIG. 3 shows a storage architecture 300 of a modular server, which includes compute sleds 301-1 and 301-2 (collectively, compute sleds 301), a storage pool 303 including storage sleds 305-1 and 305-2 (collectively, storage sleds 305), a power distribution board (PDB) 307, serial attached Small Computer System Interface (SCSI) (SAS) controllers 309-1 and 309-2 (collectively, SAS controllers 309), and a JBOD controller 311. The compute sleds 301-1 and 301-2 are each connected to each of the SAS controllers 309-1 and 309-2, via the PDB 307. Similarly, the storage sleds 305-1 and 305-2 are each connected to each of the SAS controllers 309-1 and 309-2, via the PDB 307. The SAS controllers 309-1 and 309-2 are connected to one another, as well as the JBOD controller 311. The SAS controllers 309 enable users to assign HDDs or other storage devices (e.g., of storage servers installed in the storage sleds 305 providing the storage pool 303) to different blade servers (e.g., installed in the computed sleds 301). Storage devices will be accessible only to the respective blade servers to which they are assigned. The storage devices will be accessed only by the particular blade servers assigned thereto through an internal storage controller (e.g., a Dell PowerEdge Redundant Array of Independent Disks (RAID) Controller (PERC) which is part of a corresponding one of the compute sleds 301).

Figure 4:
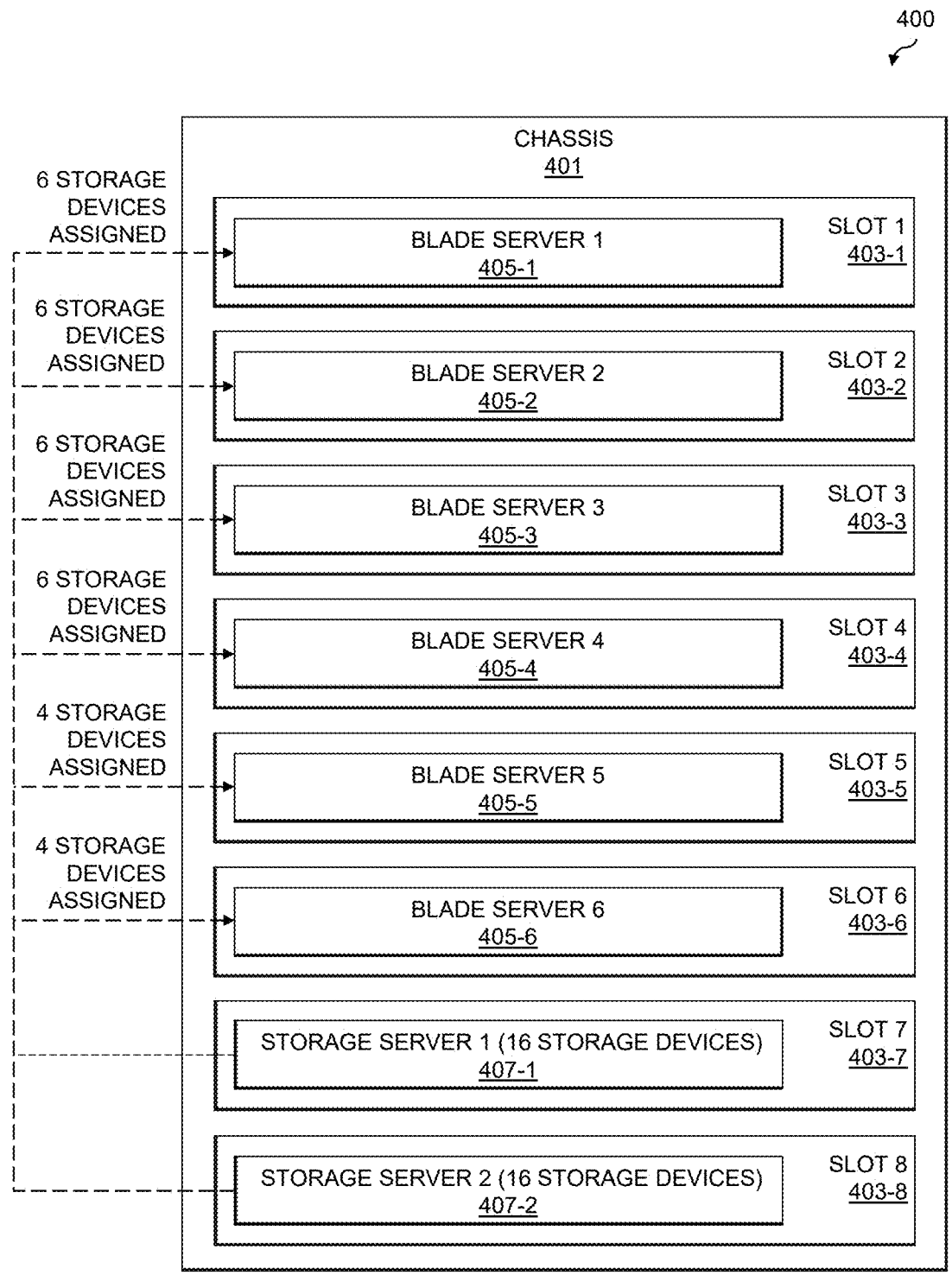
FIG. 4 shows a chassis of a modular server with multiple slots in which blade and storage servers are installed in an illustrative embodiment.

FIG. 4 shows an example of a modular server architecture 400, including a chassis 401 with a set of eight slots 403-1 through 403-8 (collectively, slots 403). A set of six blade servers 405-1 through 405-6 (collectively, blade servers 405) are installed in the slots 403-1 through 403-6 of the chassis 401, and two storage servers 407-1 and 407-2 (collectively, storage servers 407) are installed in the slots 403-7 and 403-8, respectively. The storage servers 407 may comprise Dell Insight storage pools (e.g., JBOD or other storage pools). In the FIG. 4 example, each of the storage servers 407 accommodates up to 16 HDDs or other storage devices, which are assigned to different ones of the blade servers 405 as illustrated (e.g., with six storage devices being assigned to each of the blade servers 405-1 through 405-4, and with four storage devices being assigned to the blade server 405-5 and the blade server 405-6). It should be appreciated, however, that the particular numbers of slots, blade servers, storage servers, storage devices, and the assignment of storage devices to blade servers shown in FIG. 4 is presented by way of non-limiting example only.

Referring to the information processing system 500 in FIG. 5, a chassis 501 includes a plurality of compute sleds 502-1, 502-2, . . . , 502-N (collectively "compute sleds 502"), and at least one storage sled 510. The compute sleds 502 respectively comprise storage drives 505-1, 505-2, . . .

, 505-N (collectively "storage drives 505"), SAS host bus adaptors (HBAs) 504-1, 504-2, . . . , 504-N (collectively "SAS HBAs 504") and PERCs 503-1, 503-2, . . . , 503-N (collectively "PERCs 503"). The storage sled 510 includes storage drives 515-1, . . . , 515-S (collectively "storage drives 515"), SAS expanders 516-1 and 516-2 (collectively "SAS expanders 516"), SAS re-drivers 517-1 and 517-2 (collectively "SAS re-drivers 517"), interconnect module 518 comprising the identification and routing logic 519 and a Fab-C connector 520.

The chassis 501 further includes the PDB 530, SAS IOMs 540-1 and 540-2 ("collectively "SAS IOMs 540") and a chassis controller 550. The SAS IOMs 540-1 and 540-2 respectively comprise SAS expander 541-1 and SAS expander 541-2 (collectively "SAS expanders 541") and fabric management processor (FMP) 543-1 and FMP 543-2 (collectively "FMPs 543"). The SAS IOM 540-1 further includes external connections (CONNs) 542-1, 542-2, 542-3 and 542-4, and the SAS IOM 540-2 further includes external connections (CONNs) 542-5, 542-6, 542-7 and 542-8. The external connections 542-1, 542-2, 542-3, 542-4, 542-5, 542-6, 542-7 and 542-8 are collectively referred to as "external connections 542."

In illustrative embodiments, the SAS IOMs 540 and the storage sled 510 together create data paths to be used in connection with transmission and backing up of data. The SAS IOMs 540, which are examples of SAS controllers, function as managed SAS switches providing SAS attachments for end devices to associated compute servers (e.g., blade servers 110). SAS zoning is used to associate drive bays/slots within disk enclosures to the compute sleds 502. Communication from SAS IOM 540-1 to SAS IOM 540-2 and vice versa is implemented with a Gigabit Ethernet (GbE) network link, using, for example, inter-integrated circuit ($I^2C$) protocol.

In illustrative embodiments, the storage sled 510 comprises 16 storage drives 515 such as, for example, HDDs and/or solid-state drives (SSDs). As described in more detail in connection with FIG. 7, the SAS expanders 516 collectively provide dual paths to each of the storage drives 515. In some embodiments, the SAS expanders 516 are hot-swappable, meaning that they can be removed or added to the storage sled 510 while the power remains on and without shutting down or rebooting a corresponding computer or server. The storage sled 510 provides, via the SAS expanders 516 and SAS re-drivers 517 dual X4 SAS links to a next-generation modular (NGM) SAS fabric (e.g., to Fab-C connector 520 via the interconnect module 518). The storage sled 510 is configured to provide 12 Gb SAS support.

In illustrative embodiments, the SAS IOMs 540 support SAS 3.0 connectors capable of 12 Gb/s data transmission speeds, and are backwards compatible to 6 Gb/s speeds. Each of the SAS IOMs 540 includes eight X4 internal SAS connections for connections to compute sleds (e.g., compute sleds 502) and/or storage sleds (e.g., storage sled 510). Each of the SAS IOMs 540 further includes four X4 external SAS connections (e.g., external connections 542) for connection to external SAS JBODs. In some embodiments, each of the SAS IOMs 540 includes two X4 external SAS connectors for chassis stacking. The FMPs 543 are management processors for SAS topology and JBOD management. The chassis controller 550 may include IOM common circuits for interfacing with chassis components including, but not necessarily limited to, flexible rugged external drives (FreDs), an enclosure controller (EC) and a megaRAID storage manager (MSM).

The SAS IOMs 540 are used to provide Fabric-C SAS connectivity between compute sleds (e.g., compute sleds 502) and storage sleds (e.g., storage sled 510). The two SAS IOMs 540 are installed as a redundant pair within the chassis 501. To operate as a redundant pair the SAS IOMs 540 communicate with each other. As noted herein above, the communication is implemented with a GbE link using $I^2C$ protocol. The communication between the two SAS IOMs 540 may further include a series of general-purpose input/output (GPIO) digital signal pins routed through the PDB 530.

The SAS expanders 516 provide disk expansion for the compute sleds 502. In an illustrative embodiment, the storage drives 515 are accessed by translating a storage drawer outward and accessing the storage drives 515 from the sides of the storage drawer. In an illustrative embodiment, electrically, the storage sled 510 comprises five different types of boards, plus a cable assembly. The five boards include a Fab-C SAS interface module (e.g., Fab-C SAS board 800 discussed in connection with FIG. 8), a power control module, an expander module, a backplane (4x) and a front panel large expensive disk (LED) board.

With conventional approaches, a first SAS IOM may be connected with a first SAS expander in a storage sled and vice versa, and a second SAS IOM may be connected with a second SAS expander in a storage sled and vice versa. With current configurations, if the first SAS IOM and the second SAS expander fail, or if the second SAS IOM and the first SAS expander fail, data paths can be lost even though there is redundancy with two SAS IOMs and two SAS expanders.

For example, users may need to access run-time data from drives present in a storage sled via an SAS IOM. When users are running critical applications, SAS IOMs and/or SAS expanders in a storage sled can fail due to, for example, SAS IOM firmware updates, storage sled firmware updates, shutdowns due to power fluctuations in a datacenter and/or high system workloads. Therefore, problems exist with current approaches in that even if redundant hardware components fail, data transmission paths may be lost.

Figure 6:
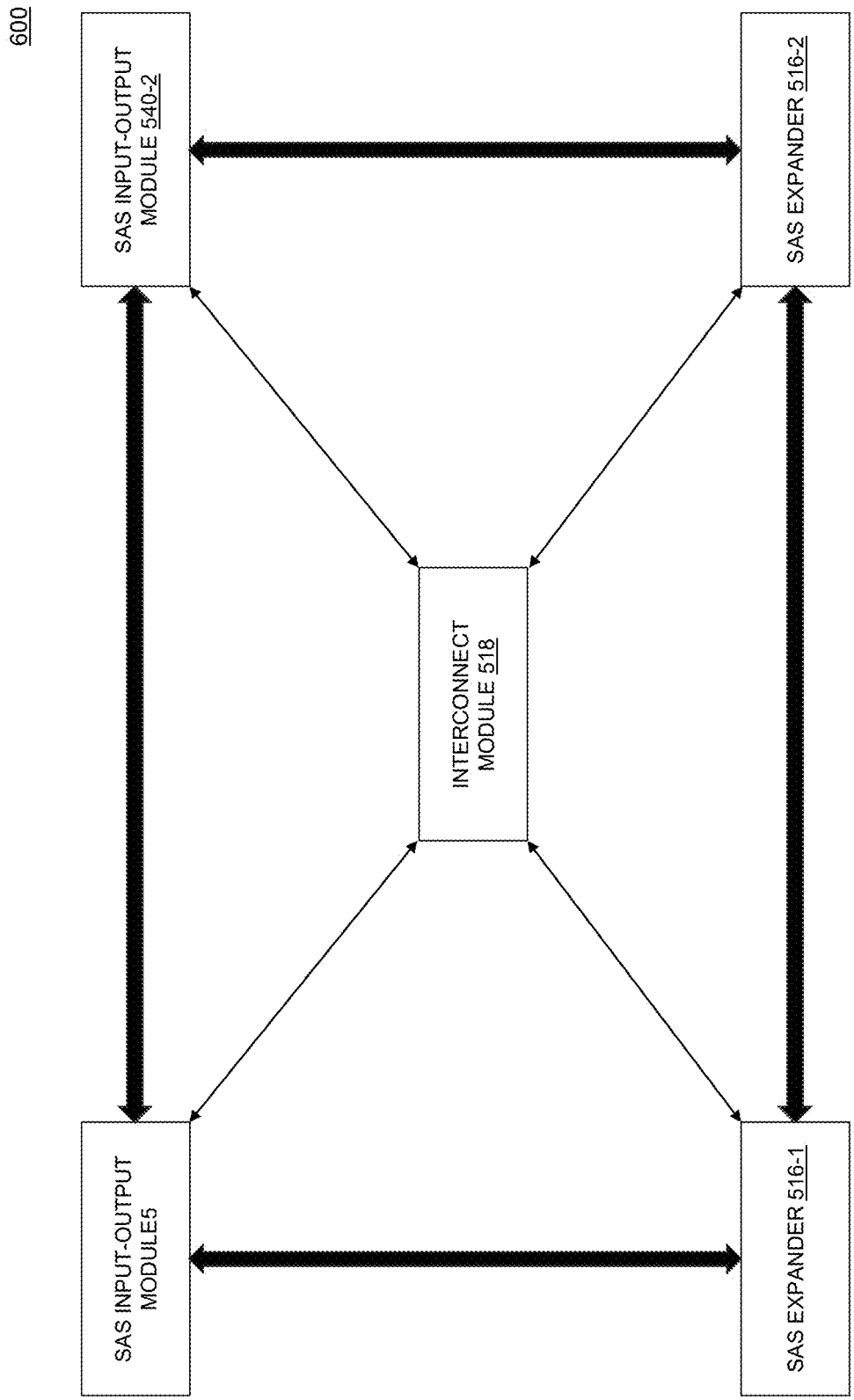
FIG. 6 shows an interconnect module cross-connected between input-output modules and expanders in an illustrative embodiment.

Referring, for example, to the information processing system 500 in FIG. 5 and to the architecture 600 in FIG. 6, the illustrative embodiments provide a technical solution in which an interconnect module 518 is connected (e.g., cross-connected) to each of a first SAS IOM 540-1, a second SAS IOM 540-2, a first SAS expander 516-1 of a storage sled 510 and a second SAS expander 516-2 of the storage sled 510. As a result, even if the first SAS IOM 540-1 and the second SAS expander 516-2 fail, or if the second SAS IOM 540-2 and the first SAS expander 516-1 fail, data can be routed through the interconnect module 518 so that data transmission paths can be maintained. Unlike conventional approaches, the interconnect module 518 ensures data path redundancy with SAS IOMs 540 and the storage sled 510 even when components fail.

In illustrative embodiments, the chassis controller 550 communicates with both SAS IOMs 540 in the chassis 501. Both of the SAS IOMs 540 provide hardware configuration data and other identifying information (e.g., inventory data) to the chassis controller 550 (e.g., management logic 116 and management database 117) and/or interconnect module 518 (e.g., identification and routing logic 519). Active (e.g., operative) SAS IOMs 540 will provide an inventory of an SAS topology to the chassis controller 550 and/or interconnect module 518 and accept commands modifying a state of attached devices, while inactive (e.g., non-operational, failed) SAS IOMs 540 will not provide an inventory of an SAS topology to the chassis controller 550 and/or interconnect module 518 and will not accept commands modifying a state of attached devices.

Communication to and from the SAS IOMs 540 uses a GbE network. This management network is referred to as Fabric D (FAB-D). In illustrative embodiments, the chassis controller 550 provides SAS topology information to the FMPs 543 on the SAS IOMs 540 to allow the FMPs 543 to create and manage SAS zones. The chassis controller 550 also uses FAB-D to gather storage subsystem inventory and status information.

The storage sled 510 is used in the chassis 501 to provide disk expansion for compute sleds 502. The SAS expanders 516 in the storage sled 510 communicate through GPIO and LED pins, which allow the firmware to synchronize the activities and support failover. The diagram of the storage sled 510 in FIG. 7 shows the interconnection between SAS expanders 516-1 and 516-2. There is an X4 SAS link between the two SAS expanders 516-1 and 516-2.

Figure 7:
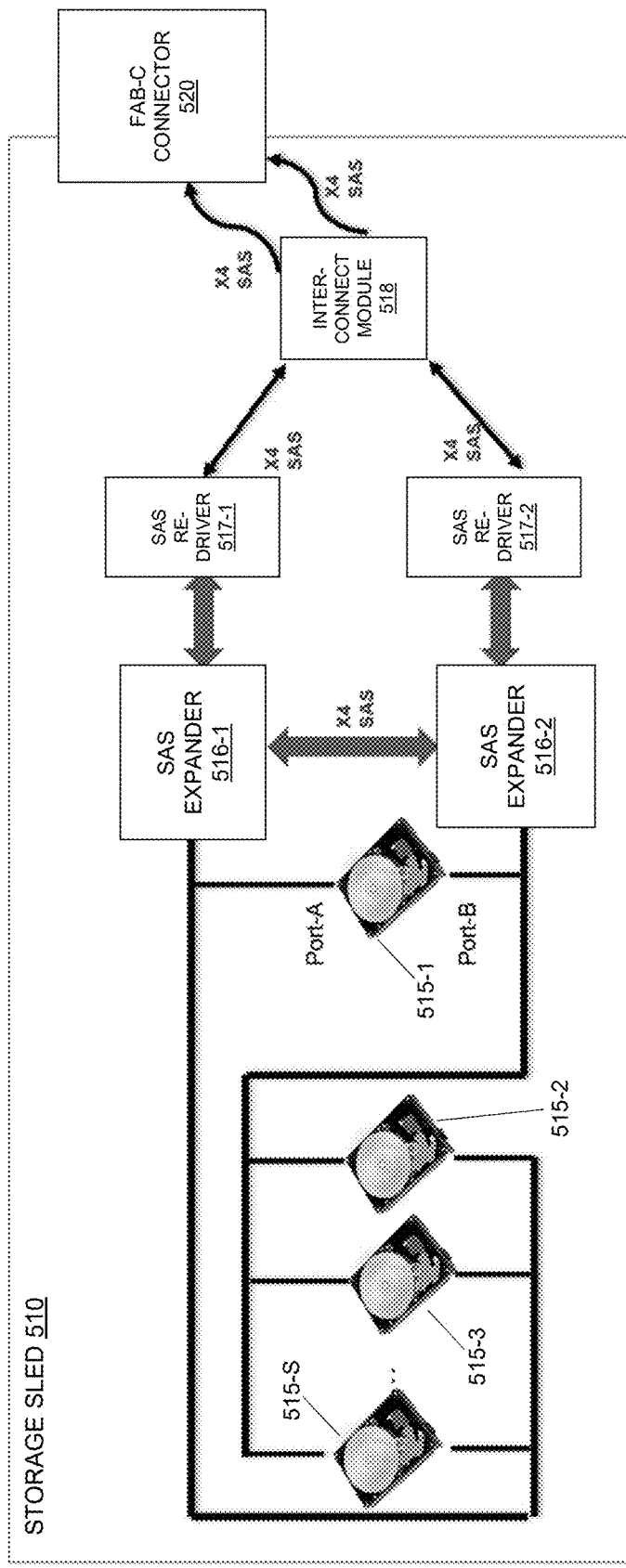
FIG. 7 shows an architecture of a storage sled including an interconnect module configured for dynamic routing of data responsive to hardware component failures in an illustrative embodiment.

Referring further to FIG. 7, the Fab-C SAS interface module via the Fab-C connector 520 connects into the PDB 530 to tie into the SAS Fabric. As shown in FIG. 7, the Fab-C interfaces support 2 groups of X4 SAS data paths extending between the Fab-C connector 520 and the interconnect module 518 and between the interconnect module 518 and the SAS re-drivers 517. Each group connects to an SAS re-driver 517-1 or 517-2 inside the storage sled 510. Eight SAS data paths (also referred to herein as "lanes") are routed through flexible cables between the SAS re-drivers 517 and the two SAS expanders 516. Four SAS data paths are routed between the SAS re-driver 517-1 and the SAS expanders 516-1 and four SAS data paths are routed between the SAS re-driver 517-2 and the SAS expander 516-2. In addition, eight SAS data paths are routed between the interconnect module 518 and the SAS re-drivers 517. Four SAS data paths are routed between the SAS re-driver 517-1 and the interconnect module 518. Four SAS data paths are routed between the SAS re-driver 517-2 and the interconnect module 518. Two groups of four SAS data paths are routed between the interconnect module 518 and the Fab-C connector 520.

The SAS expanders 516-1 and 516-2 each connect to ports on all 16 storage devices 515-1, 515-2, 515-3, ..., 515-S, where S is 16. As noted herein, the storage drives 515 can be, for example, HDDs or SSDs. SAS expander 516-1 connects to Port-A of a first group of eight storage drives 515 and to Port-B of a second group of eight storage drives 515. SAS expander 516-2 is configured opposite to SAS expander 516-1 in that SAS expander 516-2 connects to Port-B of the first group of eight storage drives 515 and to Port-A of the second group of eight storage drives 515. This forms redundancy from both of the SAS expanders 516-1 and 516-2. In an illustrative embodiment, half of the storage drives 515 are accessed through the SAS expander 516-1 and the other half are accessed through the SAS expander 516-2. As noted herein, there is also an X4 SAS link between the SAS expanders 516-1 and 516-2 to facilitate communication and synchronization between the SAS expanders 516.

As used herein, an X4 SAS communication channel uses SAS, which is a high-speed data transfer interface used for connecting storage devices such as HDDs, SSDs and other peripheral devices to a computer system. X4 SAS indicates that there are four data paths (lanes or pathways) used for data transmission. Each data path operates independently and contributes to an overall data transfer rate. The more data paths that are available, the higher the potential bandwidth for data transfer between devices. Each SAS lane may include multiple different pairs of electrical connections, which enable faster and more efficient data transfer.

Figure 8:
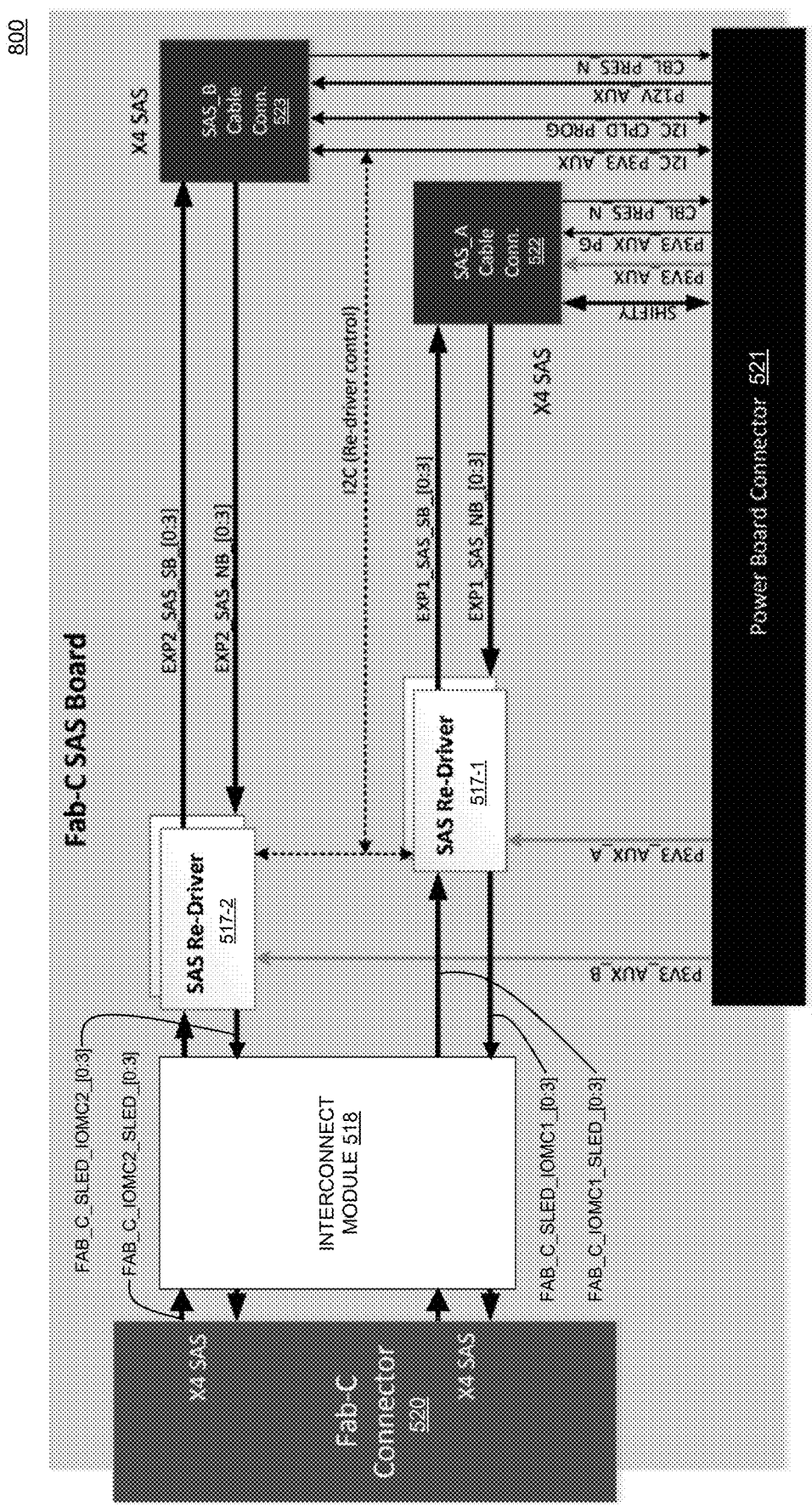
FIG. 8 shows a Fabric-C (Fab-C) serial attached small computer system interface (SCSI) (SAS) board in an illustrative embodiment.

Referring to the Fab-C SAS board 800 in FIG. 8, the Fab-C connector 520 functions as a re-driver board for two x4 SAS interfaces. These SAS signals are transmitted between the SAS IOMs 540 and the SAS expanders 516 in the storage sled 510. The Fab-C connector 520 plugs into the PDB 530. The Fab-C SAS board 800 depicts Fab-C SAS board functionality. In the Fab-C SAS board 800, the Fab-C connector 520 includes two X4 SAS cables used to transmit from the SAS IOM 540-2 (FAB-C IOM-C2 IOM) into a compute server of the Fab-C connector 520. Similarly, on the other side of Fab-C connector 520, data from SAS IOM 540-1 (FAB-C IOM C1 IOM) is transmitted into the compute server of the Fab-C connector 520. SAS re-drivers 517-1 and 517-2 are bi-directional, taking data to and from the SAS IOMs 540-1 and 540-2 and the compute servers, and sending the data to SAS expanders 516-1 and 516-2 via the interconnect module 518.

The redundant SAS re-drivers 517-1 and 517-2 are powered via the power board connector 521 using, for example, an auxiliary (AUX) cable. The power board connector 521 is also used to provide power for various functions, such as, but not necessarily limited to, "SHIFTY", "I²C CPLD", "Prog", and "power good" signals to SAS-A cable connector 522 and SAS-B cable connector 523. Following enablement of the SAS re-drivers 517 and of the interconnect module 518, the interconnect module 518 receives information regarding hardware component functionality from both SAS re-drivers 517 using the X4 SAS cables.

The identification and routing logic 519 of the interconnect module 518 identifies hardware components installed in the chassis 501. The plurality of hardware components comprise at least the SAS IOM 540-1, SAS IOM 540-2, SAS expander 516-1 and SAS expander 516-2 and can further include one or more additional components of the SAS IOMs 540 and/or storage sled 510. The identification and routing logic 519 can determine a failure of one or more of the hardware components, and dynamically routes and/or re-routes data through respective ones of the plurality of hardware components which remain operational in response to the determined failure. The data can be further routed through the interconnect module 518, which is connected to at least the SAS IOM 540-1, SAS IOM 540-2, SAS expander 516-1 and SAS expander 516-2.

The interconnect module 518 and the corresponding identification and routing logic 519 identifies each hardware component (e.g., SAS IOMs 540 and SAS expanders 516) and routes and/or re-routes data transmission paths in response to failure of the hardware components. The cross-connection of the interconnect module 518 with the SAS IOMs 540 and the SAS expanders 516 ensures continuous redundancy for the IOMs and storage sled 510 (e.g., SAS expanders 516) by enabling communication between, for example, SAS IOM 540-1 and SAS expander 516-2 through the interconnect module 518, and between, for example, SAS IOM 540-2 and SAS expander 516-1 through the interconnect module 518.

The technical solutions described herein provide functionality for using an interconnect module to create cross-connections between SAS IOMs and storage sled SAS expanders. The embodiments advantageously provide redundant data paths to prevent data loss. The illustrative embodiments advantageously provide improvements over current techniques and configurations, which fail to provide adequate redundancy of data paths when certain hardware components which are not connected to each other fail.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for dynamic routing of data responsive to hardware component failures will now be described in greater detail with reference to FIGS. 9 and 10. Although described in the context of system 100 and/or 500, these platforms may also be used to implement at least portions of other information processing systems in other embodiments.

Figure 9:
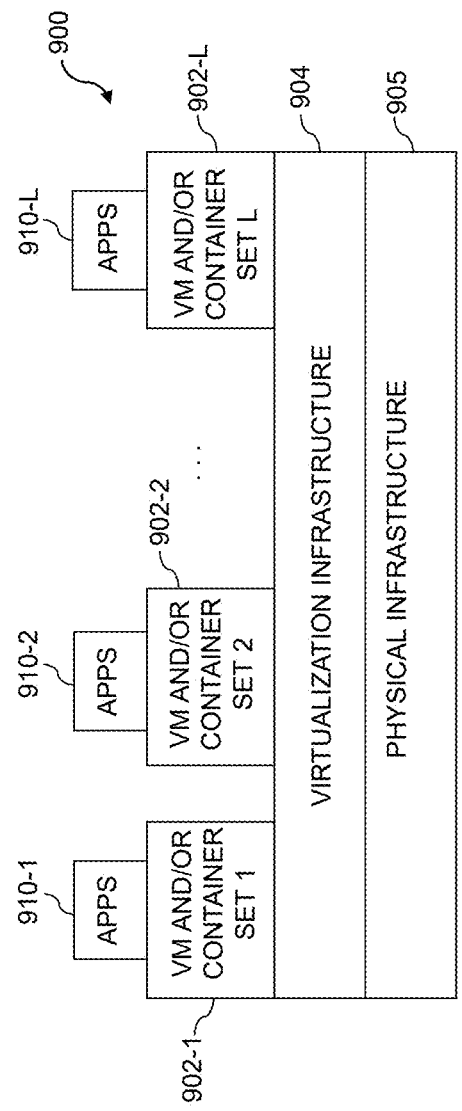
FIGS. 9 and 10 show examples of processing platforms that may be utilized to implement at least a portion of an information processing system in illustrative embodiments.
Figure 10:
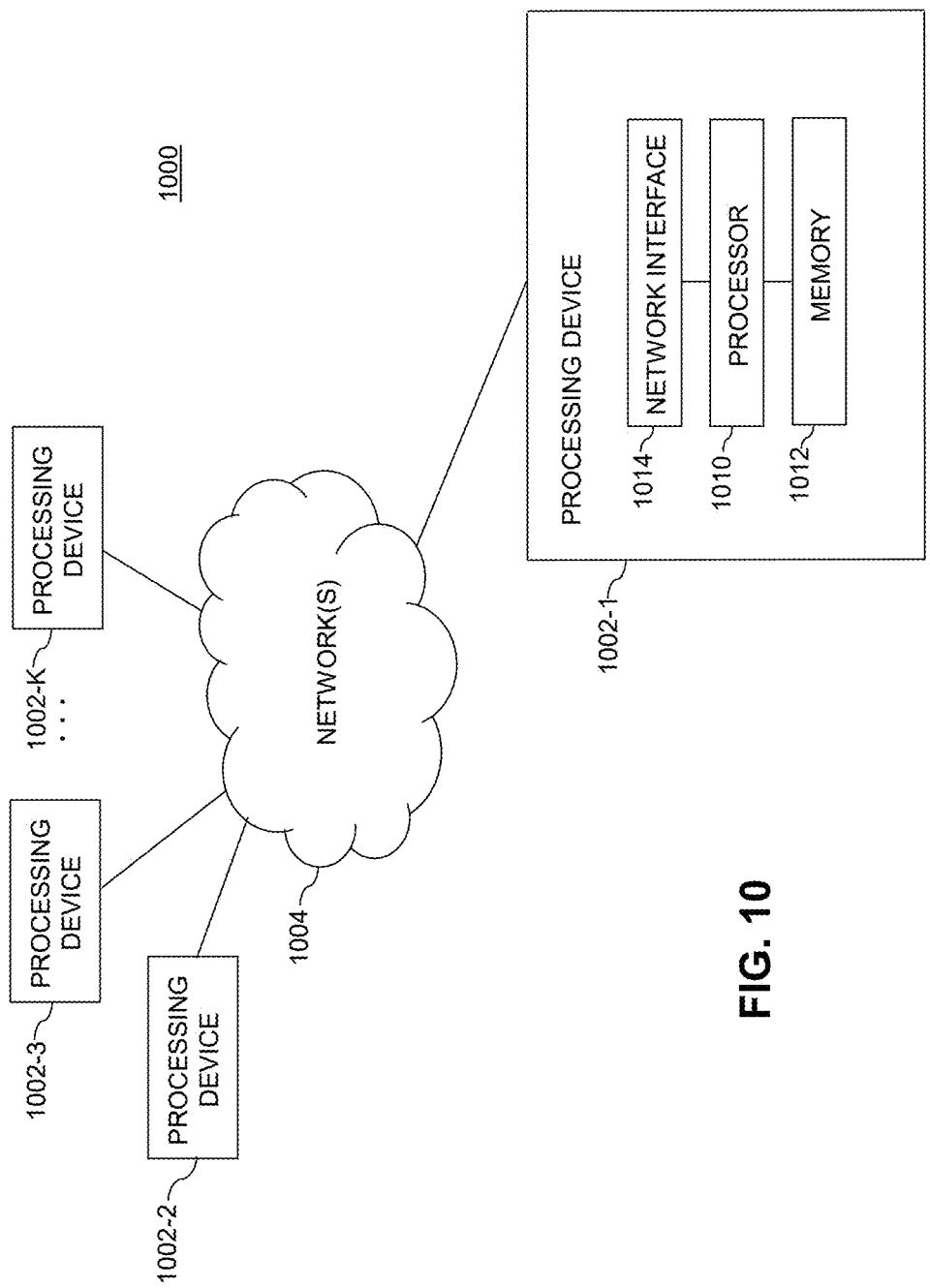

FIG. 9 shows an example processing platform comprising cloud infrastructure 900. The cloud infrastructure 900 comprises a combination of physical and virtual processing resources that may be utilized to implement at least a portion of the information processing system 100 and/or 500 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 and/or 500 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 and/or 500 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic routing of data responsive to hardware component failures as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, chassis configurations, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to identify, for a modular server comprising a chassis, a plurality of hardware components installed in the chassis, wherein the plurality of hardware components comprise at least a first input-output module and a second input-output module, and a first expander and a second expander of a storage system installed in the chassis, wherein the first input-output module is connected to the second input-output module and the first expander, wherein the second input-output module is connected to the first input-output module and the second expander, wherein the first expander is connected to the second expander and the first input-output module, and wherein the second expander is connected to the first expander and the second input-output module;
        to determine a failure of one of the first input-output module and the second input-output module, and to determine a failure of one of the first expander and the second expander; and
        to dynamically route data through respective ones of the plurality of hardware components which remain operational in response to the determined failures;
    wherein the at least one processing device is connected to the first input-output module, the second input-output module, the first expander and the second expander.

2. The apparatus of claim 1 wherein:
    the storage system comprises a storage sled;
    the at least one processing device comprises an interconnect module; and
    the interconnect module is installed in the storage sled.

3. The apparatus of claim 1 wherein identifying the plurality of hardware components installed in the chassis comprises determining a hardware configuration of each of the plurality of hardware components.

4. The apparatus of claim 1 wherein the first input-output module, the second input-output module, the first expander and the second expander respectively comprise a first serial attached small computer system interface input-output module, a second serial attached small computer system interface input-output module, a first serial attached small computer system interface expander and a second serial attached small computer system interface expander.

5. The apparatus of claim 1 wherein the at least one processing device comprises an interconnect module, and the interconnect module is connected between the respective ones of the plurality of hardware components which remain operational.

6. The apparatus of claim 5 wherein the at least one processing device is further configured to dynamically route the data through the interconnect module.

7. The apparatus of claim 1 wherein the at least one processing device comprises an interconnect module, a first signal conditioner is connected between the interconnect module and the first expander, and a second signal conditioner is connected between the interconnect module and the second expander.

8. The apparatus of claim 1 wherein the at least one processing device comprises an interconnect module, the interconnect module is connected to the first expander by a first plurality of serial attached small computer system interface communication paths and the interconnect module is connected to the second expander by a second plurality of serial attached small computer system interface communication paths.

9. The apparatus of claim 1 wherein the at least one processing device comprises an interconnect module, the interconnect module is connected to the first input-output module by a first plurality of serial attached small computer system interface communication paths and the interconnect module is connected to the second input-output module by a second plurality of serial attached small computer system interface communication paths.

10. The apparatus of claim 9 wherein the interconnect module is further connected to the first input-output module and to the second input-output module through a fabric connector.

11. The apparatus of claim 10 wherein the fabric connector is plugged into a power distribution board.

12. A computer program product comprising a non-transitory processor-readable storage medium having stored therein program code of one or more software programs, wherein the program code when executed by at least one processing device causes the at least one processing device:
    to identify, for a modular server comprising a chassis, a plurality of hardware components installed in the chassis, wherein the plurality of hardware components comprise at least a first input-output module and a second input-output module, and a first expander and a second expander of a storage system installed in the chassis, wherein the first input-output module is connected to the second input-output module and the first expander, wherein the second input-output module is connected to the first input-output module and the second expander, wherein the first expander is connected to the second expander and the first input-output module, and wherein the second expander is connected to the first expander and the second input-output module;
    to determine a failure of one of the first input-output module and the second input-output module, and to determine a failure of one of the first expander and the second expander; and
    to dynamically route data through respective ones of the plurality of hardware components which remain operational in response to the determined failures;

wherein the at least one processing device is connected to the first input-output module, the second input-output module, the first expander and the second expander.

13. The computer program product of claim 12 wherein:
the storage system comprises a storage sled;
the at least one processing device comprises an interconnect module; and
the interconnect module is installed in the storage sled.

14. The computer program product of claim 12 wherein the first input-output module, the second input-output module, the first expander and the second expander respectively comprise a first serial attached small computer system interface input-output module, a second serial attached small computer system interface input-output module, a first serial attached small computer system interface expander and a second serial attached small computer system interface expander.

15. The computer program product of claim 12 wherein the at least one processing device comprises an interconnect module, and the interconnect module is connected between the respective ones of the plurality of hardware components which remain operational.

16. The computer program product of claim 12 wherein the at least one processing device comprises an interconnect module, the interconnect module is connected to the first expander by a first plurality of serial attached small computer system interface communication paths and the interconnect module is connected to the second expander by a second plurality of serial attached small computer system interface communication paths.

17. A method comprising:
identifying, for a modular server comprising a chassis, a plurality of hardware components installed in the chassis, wherein the plurality of hardware components comprise at least a first input-output module and a second input-output module, and a first expander and a second expander of a storage system installed in the chassis, wherein the first input-output module is connected to the second input-output module and the first expander, wherein the second input-output module is connected to the first input-output module and the second expander, wherein the first expander is connected to the second expander and the first input-output module, and wherein the second expander is connected to the first expander and the second input-output module;
determining a failure of one of the first input-output module and the second input-output module, and determining a failure of one of the first expander and the second expander; and
dynamically routing data through respective ones of the plurality of hardware components which remain operational in response to the determined failures;
wherein the method is performed by at least one processing device comprising a processor coupled to a memory; and
wherein the at least one processing device is connected to the first input-output module, the second input-output module, the first expander and the second expander.

18. The method of claim 17 wherein the first input-output module, the second input-output module, the first expander and the second expander respectively comprise a first serial attached small computer system interface input-output module, a second serial attached small computer system interface input-output module, a first serial attached small computer system interface expander and a second serial attached small computer system interface expander.

19. The method of claim 17 wherein the at least one processing device comprises an interconnect module, and the interconnect module is connected between the respective ones of the plurality of hardware components which remain operational.

20. The method of claim 17 wherein the at least one processing device comprises an interconnect module, the interconnect module is connected to the first expander by a first plurality of serial attached small computer system interface communication paths and the interconnect module is connected to the second expander by a second plurality of serial attached small computer system interface communication paths.

* * * * *